(12) United States Patent
Park

(10) Patent No.: US 12,534,033 B2
(45) Date of Patent: Jan. 27, 2026

(54) DEVICE AND METHOD FOR CONTROLLING VEHICLE

(71) Applicants: HYUNDAI MOTOR COMPANY, Seoul (KR); Kia Corporation, Seoul (KR)

(72) Inventor: Se Hoon Park, Yongin-si (KR)

(73) Assignees: HYUNDAI MOTOR COMPANY, Seoul (KR); Kia Corporation, Seoul (KR)

( * ) Notice: Subject to any disclaimer, the term of this patent is extended or adjusted under 35 U.S.C. 154(b) by 34 days.

(21) Appl. No.: 18/776,777

(22) Filed: Jul. 18, 2024

(65) Prior Publication Data

US 2025/0164337 A1 May 22, 2025

(30) Foreign Application Priority Data

Nov. 20, 2023 (KR) .......................... 10-2023-0161398

(51) Int. Cl.
| | |
|---|---|
| *B60R 11/02* | (2006.01) |
| *B60R 16/03* | (2006.01) |
| *G01M 3/02* | (2006.01) |
| *G07C 5/08* | (2006.01) |
| *H02J 7/00* | (2006.01) |

(52) U.S. Cl.
CPC .............. *B60R 16/03* (2013.01); *G01M 3/02* (2013.01); *G07C 5/0808* (2013.01); *H02J 7/0032* (2013.01)

(58) Field of Classification Search
None
See application file for complete search history.

(56) References Cited

U.S. PATENT DOCUMENTS

2021/0170961 A1* 6/2021 Kato ..................... B60R 11/04

* cited by examiner

*Primary Examiner* — Peter D Nolan
*Assistant Examiner* — Michael F Whalen
(74) *Attorney, Agent, or Firm* — MORGAN, LEWIS & BOCKIUS LLP

(57) ABSTRACT

A device for controlling a vehicle includes a sensor that obtains state information of the vehicle, and a power controller which is configured to determine whether an activation condition of a dark current blocking control function is satisfied based on the state information of the vehicle, determines whether a power control mode is selected when the activation condition of the dark current blocking control function is not satisfied, and controls to cut off power supply to a dark current load based on the selected power control mode.

18 Claims, 7 Drawing Sheets

DEVICE AND METHOD FOR CONTROLLING VEHICLE

CROSS-REFERENCE TO RELATED APPLICATION

The present application claims priority to Korean Patent Application No. 10-2023-0161398, filed on Nov. 20, 2023, the entire contents of which is incorporated herein for all purposes by this reference.

BACKGROUND OF THE PRESENT DISCLOSURE

Field of the Present Disclosure

The present disclosure relates to a device and a method for controlling a vehicle, and more specifically, to a device and a method for controlling a vehicle that perform dark current blocking control.

Description of Related Art

Because power of an electrical component (an electrical device) mounted in a vehicle depends on a limited capacity of a battery for the vehicle, when current consumed in a vehicle turn-off state where an engine or a motor is not able to charge the battery is not properly managed, discharge of the vehicle battery occurs and the vehicle doesn't start, causing inconvenience to a driver.

Accordingly, a function of controlling the power by appropriately blocking dark current consumed in the vehicle turn-off state is being applied. For example, the power supplied to the electrical component (hereinafter, referred to as a dark current load) that generates the dark current is cut off when an SOC value of the battery falls to a certain level or lower, the power supplied to the dark current load is cut off when a certain time period passes after the vehicle electrical equipment does not operate for a certain time period and a communication state thereof becomes a sleep state, or the power supplied to the dark current load is cut off when an ignition (IGN) ON (the power is supplied to entire electrical components other than a starter) or an accessory (ACC) ON (the power is supplied to some electrical components unrelated to driving) state maintains for a certain time period.

In general, for accident prevention and safety, the control function for blocking the dark current is performed only when conditions of the turn-off state, a gear P-stage, and a vehicle speed lower than a critical speed are satisfied. Therefore, in a situation in which the above-described conditions are not satisfied as in a vehicle production plant, the dark current blocking control function is not properly performed, so that the battery discharge often occurs.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a device and a method for controlling a vehicle that allow control to block dark current to be performed even at a vehicle production plant that produces the vehicle before delivering the vehicle to a customer.

Another aspect of the present disclosure provides a device and a method for controlling a vehicle that prevent a reduction in a vehicle production unit per hour (UPH), such as a production line stoppage resulted from battery discharge at a vehicle production plant, an inspection time delay, an increase in a production time resulted from additional battery charging, and a decrease in a quality pass rate.

Another aspect of the present disclosure provides a device and a method for controlling a vehicle that allow dark current to be appropriately blocked based on a vehicle production plant environment by allowing a dark current blocking mode to be selected based on a terrain and the environment of the vehicle production plant.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a device for controlling a vehicle includes a sensor that obtains state information of the vehicle, and a power controller which is configured to determine whether an activation condition of a dark current blocking control function is satisfied based on the state information of the vehicle, to determine whether a power control mode is selected when the activation condition of the dark current blocking control function is not satisfied, and to control to cut off power supply to a dark current load based on the selected power control mode.

In an exemplary embodiment of the present disclosure, the power controller may be configured to determine whether the power control mode including a first plant mode and a second plant mode is selected when the activation condition of the dark current blocking control function is not satisfied.

In an exemplary embodiment of the present disclosure, the power controller may be configured to determine whether a test process is performed in a vehicle production process when the power controller concludes that the power control mode is selected.

In an exemplary embodiment of the present disclosure, the test process may include a watertight test process of spraying water under a pressure for a predetermined time period while the vehicle is sealed.

In an exemplary embodiment of the present disclosure, the power controller may increase a detection count value whenever the power controller concludes via the rain sensor that that a time period in which the water is sprayed under the pressure during the watertightness test process is greater than or equal to a reference time period.

In an exemplary embodiment of the present disclosure, the power controller may be configured to determine whether a dark current load power supply maintenance time has passed when the first plant mode is selected and the detection count value is greater than or equal to a predetermined value.

In an exemplary embodiment of the present disclosure, the power controller may cut off the power supply to the dark current load when the first plant mode is selected, the detection count value is greater than or equal to the predetermined value, and the dark current load power supply maintenance time has passed.

In an exemplary embodiment of the present disclosure, the power controller may change a gear stage from an N-stage to a P-stage and determine whether the dark current load power supply maintenance time has passed when the second plant mode is selected and the detection count value is greater than or equal to the predetermined value.

In an exemplary embodiment of the present disclosure, the power controller may cut off the power supply to the dark current load when the second plant mode is selected, the power controller concludes that the detection count value is greater than or equal to the predetermined value, the gear stage is changed from the N-stage to the P-stage, and the power controller concludes that the dark current load power supply maintenance time has passed.

According to another aspect of the present disclosure, a method for controlling a vehicle includes determining whether an activation condition of a dark current blocking control function is satisfied based on state information of the vehicle, determining whether a power control mode is selected when the activation condition of the dark current blocking control function is not satisfied, and controlling to cut off power supply to a dark current load based on the selected power control mode.

In an exemplary embodiment of the present disclosure, the method may further include determining whether the power control mode including a first plant mode and a second plant mode is selected when the activation condition of the dark current blocking control function is not satisfied.

In an exemplary embodiment of the present disclosure, the method may further include determining whether a test process is performed in a vehicle production process when the power controller concludes that the power control mode is selected.

In an exemplary embodiment of the present disclosure, the test process may include a watertight test process of spraying water under a pressure for a predetermined time period while the vehicle is sealed.

In an exemplary embodiment of the present disclosure, the method may further include increasing a detection count value whenever the power controller concludes via a rain sensor that a time period in which the water is sprayed under the pressure during the watertightness test process is greater than or equal to a reference time period.

In an exemplary embodiment of the present disclosure, the method may further include determining whether a dark current load power supply maintenance time has passed when the first plant mode is selected and the detection count value is greater than or equal to a predetermined value.

In an exemplary embodiment of the present disclosure, the method may further include cutting off the power supply to the dark current load when the first plant mode is selected, the detection count value is greater than or equal to the predetermined value, and the dark current load power supply maintenance time has passed.

In an exemplary embodiment of the present disclosure, the method may further include changing a gear stage from an N-stage to a P-stage and determining whether the dark current load power supply maintenance time has passed when the second plant mode is selected and the detection count value is greater than or equal to the predetermined value.

In an exemplary embodiment of the present disclosure, the method may further include cutting off the power supply to the dark current load when the second plant mode is selected, the detection count value is greater than or equal to the predetermined value, the gear stage is changed from the N-stage to the P-stage, and the dark current load power supply maintenance time has passed.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
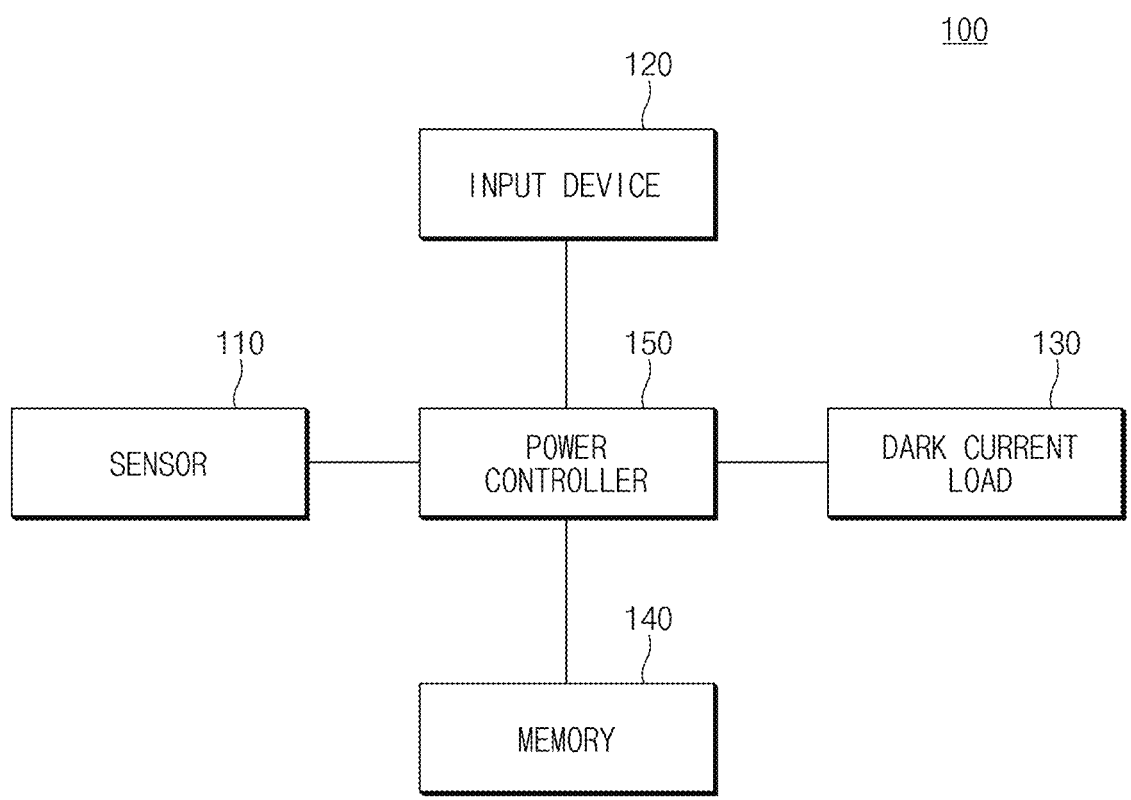
FIG. 1 is a diagram showing a configuration of a vehicle control device according to an exemplary embodiment of the present disclosure.

It may be understood that the appended drawings are not necessarily to scale, presenting a somewhat simplified representation of various features illustrative of the basic principles of the present disclosure. The predetermined design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments of the present disclosure will be described in detail with reference to the exemplary drawings. In adding the reference numerals to the components of each drawing, it should be noted that the identical or equivalent component is designated by the identical numeral even when they are displayed on other drawings. Furthermore, in describing the exemplary embodiment of the present disclosure, a detailed description of the related known configuration or function will be omitted when it is determined that it interferes with the understanding of the exemplary embodiment of the present disclosure.

In describing the components of the exemplary embodiment of the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein include the same meaning as commonly understood by one of ordinary skill in the art to which the present disclosure belongs. It will be further understood that terms, such as those defined in commonly used dictionaries, should be interpreted as including a meaning which is consistent with their meaning in the context of the relevant art and will not be interpreted in an idealized or overly formal sense unless expressly so defined herein.

FIG. 1 is a diagram showing a configuration of a vehicle control device according to an exemplary embodiment of the present disclosure.

As shown in FIG. 1, a vehicle control device 100 of the present disclosure may include a sensor 110, an input device 120, a dark current load 130, a memory 140, and a power controller 150.

The sensor 110 may obtain state information of a vehicle. According to an exemplary embodiment of the present disclosure, the sensor 110 may include a speed sensor, a battery sensor, and the like, and obtain the state information including a speed of the vehicle, a state of charge (SOC) value of a battery, and the like. Additionally, the sensor 110 may include a rain sensor that detects water droplets sprayed onto the vehicle and an inclination sensor that detects an inclination of the vehicle.

The input device 120 may receive an input corresponding to a touch, a motion, or a voice of a user and transmit the input to the power controller 150, and the power controller 150 may be configured for controlling an operation of the vehicle control device in response to input information. According to an exemplary embodiment of the present disclosure, the input device 120 may include touch input means (touch pad) or mechanical input means (button). The input device 120 may be disposed in an area of a steering wheel, and the user may change a power control mode by manipulating the input device 120 with a finger thereof while gripping the steering wheel. For example, the power control mode may be changed based on the number of times the input device 120 is pressurized within a predetermined time period and a pressurization maintenance time. According to another exemplary embodiment of the present disclosure, the input device 120 may be implemented as at least one of a motion sensor or a voice recognition sensor that detects the motion or the voice of the user or any combination thereof.

The dark current load 130 may include an electronic device in which power supply from the battery to the electronic device is cut off when an activation condition of a dark current blocking control function is satisfied. According to an exemplary embodiment of the present disclosure, the dark current load 130 may include a first dark current load, a second dark current load, and a third dark current load that are classified based on a time period (a power supply maintenance time) for which the power supply to the dark current load is maintained. For example, the dark current load 130 may include a vehicle interior lighting, an external lighting, and a control device.

The memory 140 may store at least one algorithm that performs calculation or execution of various commands for the operation of the vehicle control device according to an exemplary embodiment of the present disclosure. According to an exemplary embodiment of the present disclosure, the memory 140 may store at least one command executed by the power controller 150 operatively connected to the memory 140, and the command may cause the vehicle control device of the present disclosure to operate. The memory 140 may include at least one storage medium among a flash memory, a hard disk, a memory card, a read-only memory (ROM), a random access memory (RAM), an electrically erasable programmable read-only memory (EEPROM), a programmable read-only memory (PROM), a magnetic memory, a magnetic disk, and an optical disk.

The power controller 150 may supply the power to or cut off the power supply to the dark current load 130. According to an exemplary embodiment of the present disclosure, the power controller 150 may be configured to determine whether the activation condition of the dark current blocking control function is satisfied based on the state information of the vehicle, and when the activation condition of the dark current blocking control function is not satisfied and when a dark current blocking mode is selected based on surroundings information of the vehicle, cut off the power supply to the dark current load. According to an exemplary embodiment of the present disclosure, the power controller 150 may include a processor 151, and an intelligent power switch (IPS) and a relay that supply the power to or cut off the power supply to the dark current load.

Figure 2:
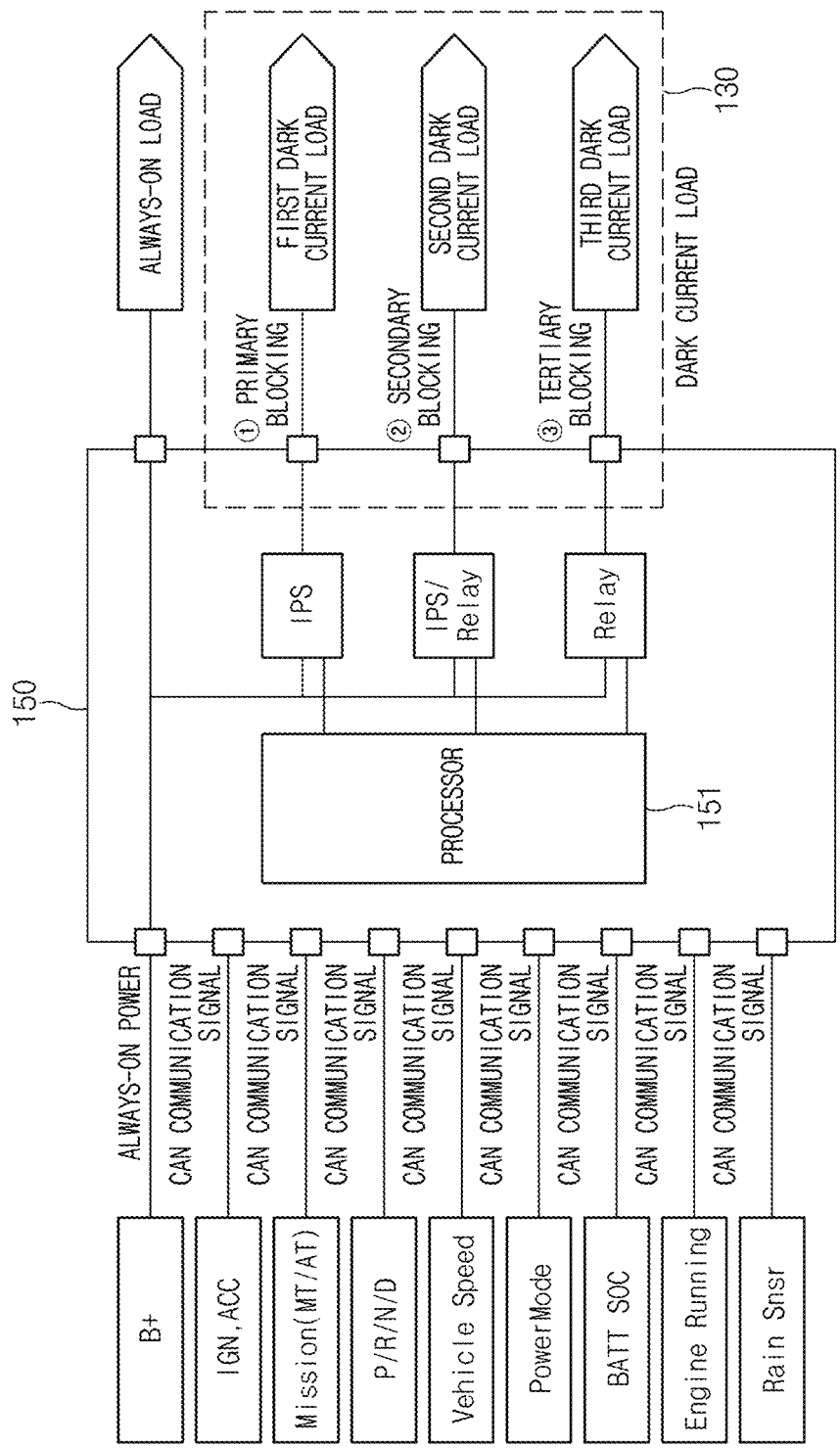
FIG. 2 is a diagram schematically showing a vehicle control device according to an exemplary embodiment of the present disclosure.

The processor 151 may be implemented by a variety of processing devices with a built-in semiconductor chip or the like which may perform the calculation or the execution of the various commands, and may be configured for controlling the operation of the power controller according to an exemplary embodiment of the present disclosure. The processor 151 may be electrically connected to the sensor 110, the input device 120, the dark current load 130, and the memory 140 via a wired cable or various circuits to transmit an electrical signal including a control command or the like, and may perform calculation or data processing regarding control and/or communication. The processor 151 may include at least one of a central processing unit, an application processor, or a communication processor (CP), or any combination thereof. Refer to FIG. 2 for a detailed description of the power controller 150.

FIG. 2 is a diagram schematically showing a vehicle control device according to an exemplary embodiment of the present disclosure.

As shown in FIG. 2, the power controller 150 may always supply B+ power from the battery to an always-on load regardless of whether the activation condition of the dark current blocking control function is satisfied.

The power controller 150 may receive an IGN signal and an ACC signal and determine IGN ON/IGN OFF or ACC ON/ACC OFF.

The power controller 150 may receive vehicle speed information and determine whether the vehicle speed is equal to or lower than a reference speed.

The power controller 150 may receive battery information and determine the SOC value of the battery.

The power controller 150 may receive engine operation signal information to determine whether the vehicle is turned ON/OFF.

The power controller 150 may supply the power to the dark current load, receive the power control mode (a first plant mode/a second plant mode/a customer mode/a vehicle transport mode) selected based on a user input signal, transmission information (a manual transmission/an automatic transmission), gear stage information (a P-stage, an R-stage, an N-stage, and a D-stage), and rain sensor detection information, and cut off the power supply to the dark current load based on the dark current blocking mode.

According to an exemplary embodiment of the present disclosure, the power controller 150 may supply the power to the dark current load, and when a vehicle is turned off and a vehicle state changes to the IGN ON state and the ACC ON state, determine whether the vehicle speed is equal to or lower than the reference speed or whether the SOC value of the battery is equal to or lower than a reference SOC.

When the vehicle speed is equal to or lower than the reference speed and the SOC value of the battery is equal to or lower than the reference SOC value, the power controller 150 may be configured to determine whether a gear stage is in the P-stage. According to an exemplary embodiment of the present disclosure, the power controller 150 may be configured to determine that the activation condition of the dark current blocking control function is satisfied when the vehicle is turned off and vehicle state is the IGN ON state and the ACC ON state, the vehicle speed is equal to or lower than the reference speed, the SOC value of the battery is equal to or lower than the reference SOC value, and the gear stage is in the P-stage.

When it is determined that the gear stage is in the P-stage, the power controller 150 may be configured to determine whether the time period (the power supply maintenance time) for which the power supply to the dark current load 130 is maintained has passed. In this regard, the power supply maintenance time may be set differently for each dark current load. For example, the power supply maintenance time may be set to 5 minutes for the first dark current load, the power supply maintenance time may be set to 10 minutes for the second dark current load, and the power supply maintenance time may be set to 30 minutes for the third dark current load.

The power controller 150 may cut off the power supply to the dark current load 130 when the gear state is in the P-stage and the time period (the power supply maintenance time) for which the power supply to the dark current load 130 is maintained has passed.

On the other hand, when it is determined that the gear stage is not in the P-stage, the power controller 150 may be configured to determine whether the gear stage is in the N-stage and whether the first plant mode is selected. In this regard, the first plant mode may include a mode in which the power controller 150 operates in a situation in which a normal vehicle test process is able to be performed in a vehicle production process while maintaining the N-stage. As an exemplary embodiment of the present disclosure, the first plant mode may include a mode suitable for a plant with a flat plant terrain, or a low risk of safety accident, and a continuous vehicle evaluation being performed in the N-stage.

When it is determined that the gear stage is in the N-stage and the first plant mode is selected, the power controller 150 may be configured to determine whether the test process is performed in the vehicle production process. According to an exemplary embodiment of the present disclosure, the power controller 150 may be configured to determine whether a watertightness test process of spraying water under pressure for a predetermined time period while the vehicle is sealed is performed.

The power controller 150 may be configured to determine whether a time period for which the water sprayed under the pressure during the test process is detected by the rain sensor is greater than or equal to a reference time period. When it is determined that the time period for which the water sprayed under the pressure during the test process is detected by the rain sensor is greater than or equal to the reference time period, the power controller 150 may be configured to determine that the watertightness test process is being performed and increase a detection count value by 1.

Whenever it is determined that the time period for which the water sprayed under the pressure during the test process is detected by the rain sensor is greater than or equal to the reference time period, the power controller 150 may increase the detection count value by 1 and determine whether the detection count value is greater than or equal to a predetermined value.

When it is determined that the detection count value is greater than or equal to the predetermined value, the power controller 150 may be configured to determine whether the time period (the power supply maintenance time) for which the power supply to the dark current load 130 is maintained has passed.

The power controller 150 may initialize the detection count value when the time period (the power supply maintenance time) for which the power supply to the dark current load 130 is maintained has passed, and may cut off the power supply to the dark current load 130 when the detection count value is initialized.

On the other hand, when it is determined that the first plant mode is not selected, the power controller 150 may be configured to determine whether the gear stage is in the N-stage and the second plant mode is selected. In this regard, the second plant mode may include a mode in which the normal vehicle test process is not able to be performed in the vehicle production process while maintaining the N-stage, and thus, the gear stage is changed from the N-stage to the P-stage and then the power controller 150 operates. As an exemplary embodiment of the present disclosure, the second plant mode may include a mode suitable for a plant where a plant terrain includes an inclined area, or there is a high risk of safety accident, and the change from the N-stage to the P-stage may be performed when the power supply needs to be cut off during the vehicle evaluation.

When it is determined that the gear stage is in the N-stage and the second plant mode is selected, the power controller 150 may be configured to determine whether the test process is performed in the vehicle production process. According to an exemplary embodiment of the present disclosure, the power controller 150 may be configured to determine whether the watertightness test process of spraying the water under the pressure for the predetermined time period is performed while the vehicle is sealed.

The power controller 150 may be configured to determine whether the time period for which the water sprayed under the pressure during the test process is detected by the rain sensor is greater than or equal to the reference time period. When it is determined that the time period for which the water sprayed under the pressure during the test process is detected by the rain sensor is greater than or equal to the reference time period, the power controller 150 may be configured to determine that the watertightness test process is being performed and increase the detection count value by 1.

Whenever it is determined that the time period for which the water sprayed under the pressure during the test process is detected by the rain sensor is greater than or equal to the reference time period, the power controller 150 may increase the detection count value by 1 and determine whether the detection count value is greater than or equal to the predetermined value.

When it is determined that the detection count value is greater than or equal to the predetermined value, the power controller 150 may forcibly change the gear stage from the N-stage to the P-stage. The power controller 150 may be configured to determine whether the time period (the power supply maintenance time) for which the power supply to the dark current load 130 is maintained has passed when the gear stage is changed to the P-stage.

When the time period (the power supply maintenance time) for which the power supply to the dark current load 130 is maintained has passed, the power controller 150 may initialize the detection count value and cut off the power supply to the dark current load 130.

When the gear stage is set to the P-stage or the gear stage is in the N-stage and the first plant mode is selected, and it is determined that the power supply to the dark current load 130 is cut off, the power controller 150 may be configured to determine whether the vehicle is turned on, the vehicle state is changed to the IGN OFF state and the ACC OFF state, the vehicle speed exceeds the reference speed, the battery SOC exceeds the reference SOC value, or the gear stage changes from the P-stage or the N-stage to the R-stage or the D-stage.

When the gear stage is set to the P-stage or the gear stage is in the N-stage and the first plant mode is selected, and it is determined that the power supply to the dark current load 130 is cut off, the power controller 150 may release the cut-off of the power supply to the dark current load 130 and allow the power to be supplied thereto when it is determined that the vehicle is turned on, the vehicle state is changed to the IGN OFF state and the ACC OFF state, the vehicle speed exceeds the reference speed, the battery SOC exceeds the reference SOC value, or the gear stage changes from the P-stage or the N-stage to the R-stage or the D-stage.

On the other hand, when it is determined that the vehicle is not turned on, the vehicle state is not changed to the IGN OFF state and the ACC OFF state, the vehicle speed does not exceed the reference speed, the battery SOC does not exceed the reference SOC VALUE, and the gear stage is not changed from the P-stage or the N-stage to the R-stage or the D-stage, the power controller 150 may be configured to determine whether the gear stage is in the N-stage.

When it is determined that the gear stage is in the N-stage, the power controller 150 may be configured to determine whether the vehicle transport mode or the customer mode is selected as the power control mode. In this regard, the vehicle transport mode may include a mode in which the power controller 150 operates while the vehicle is transported to a customer after the vehicle production process is completed, and the customer mode may include a mode in which the power controller 150 operates after the vehicle is delivered to the customer.

When it is determined that the gear stage is in the N-stage and the vehicle transport mode or the customer mode is selected as the power control mode, the power controller 150 may release the cut-off of the power supply to the dark current load 130 and allow the power to be supplied thereto.

On the other hand, when it is determined that the gear stage is not in the N-stage or the vehicle transport mode and the customer mode are not selected as the power control mode, the power controller 150 may allow the cut-off of the power supply to the dark current load 130 to be maintained.

When the second plant mode is selected and the gear stage is changed to the P-stage, and it is determined that the power supply to the dark current load 130 is cut off, the power controller 150 may be configured to determine whether the vehicle is turned on, the vehicle state is changed to the IGN OFF state and the ACC OFF state, the vehicle speed exceeds the reference speed, the battery SOC exceeds the reference SOC value, or the gear stage changes from the P-stage to the R-stage, the D-stage, or the N-stage.

When the second plant mode is selected, the gear stage is changed to the P-stage, and it is determined that the power supply to the dark current load 130 is cut off, the power controller 150 may release the cut-off of the power supply to the dark current load 130 and allow the power to be supplied thereto when it is determined that the vehicle is turned on, the vehicle state is changed to the IGN OFF state and the ACC OFF state, the vehicle speed exceeds the reference speed, the battery SOC exceeds the reference SOC value, or the gear stage changes from the P-stage to the R-stage, the D-stage, or the N-stage.

FIG. 3, FIG. 4, FIG. 5 and FIG. 6 are diagrams showing a vehicle control method according to an exemplary embodiment of the present disclosure.

Figure 3:
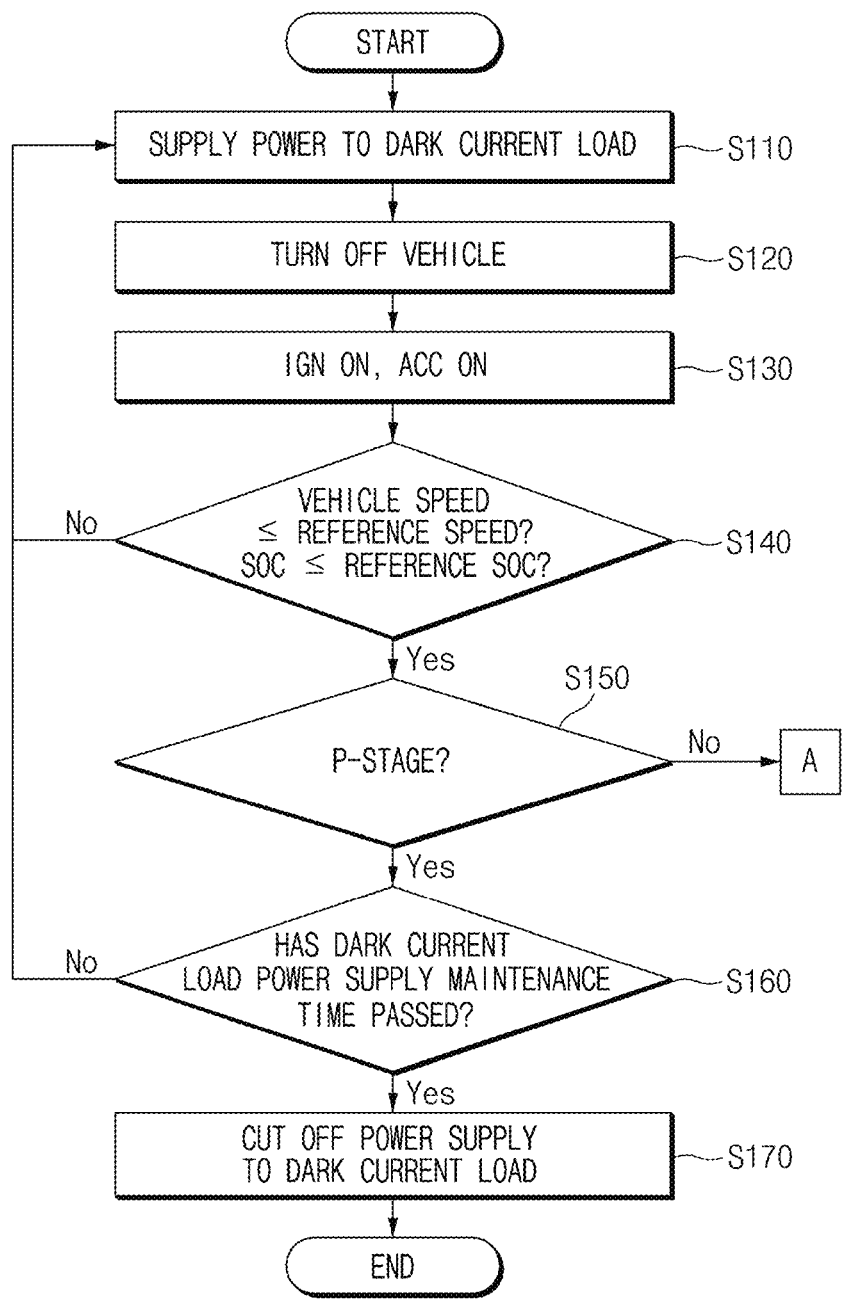
FIG. 3, FIG. 4, FIG. 5 and FIG. 6 are diagrams showing a vehicle control method according to an exemplary embodiment of the present disclosure.

As shown in FIG. 3, the power controller 150 may supply the power to the dark current load (S110).

When it is determined that the vehicle is turned off (S120) and the vehicle state is the IGN ON state and the ACC ON state (S130), the power controller 150 may be configured to determine whether the vehicle speed is equal to or lower than the reference speed and the SOC value of the battery is equal to or lower than the reference SOC (S140).

When the vehicle speed is equal to or lower than the reference speed and the SOC value of the battery is equal to or lower than the reference SOC value, the power controller 150 may be configured to determine whether the gear stage is in the P-stage (S150). According to an exemplary embodiment of the present disclosure, the power controller 150 may be configured to determine that the activation condition of the dark current blocking control function is satisfied when the vehicle is turned off, the vehicle is in the IGN ON state and the ACC ON state, the vehicle speed is equal to or lower than the reference speed, the SOC value of the battery is equal to or lower than the reference SOC value, and the gear stage is in the P-stage.

When it is determined that the gear stage is in the P-stage, the power controller 150 may be configured to determine whether the time period (the power supply maintenance time) for which the power supply to the dark current load 130 is maintained has passed (S160). In this regard, the power supply maintenance time may be set differently for each dark current load. For example, the power supply maintenance time may be set to the 5 minutes for the first dark current load, the power supply maintenance time may be set to the 10 minutes for the second dark current load, and the power supply maintenance time may be set to the 30 minutes for the third dark current load.

The power controller 150 may cut off the power supply to the dark current load 130 when the gear state is in the P-stage and the time period (the power supply maintenance time) for which the power supply to the dark current load 130 is maintained has passed (S170).

On the other hand, the case in which the power controller 150 is configured to determine that the gear stage is not in the P stage will be described with reference to FIG. 4.

Figure 4:
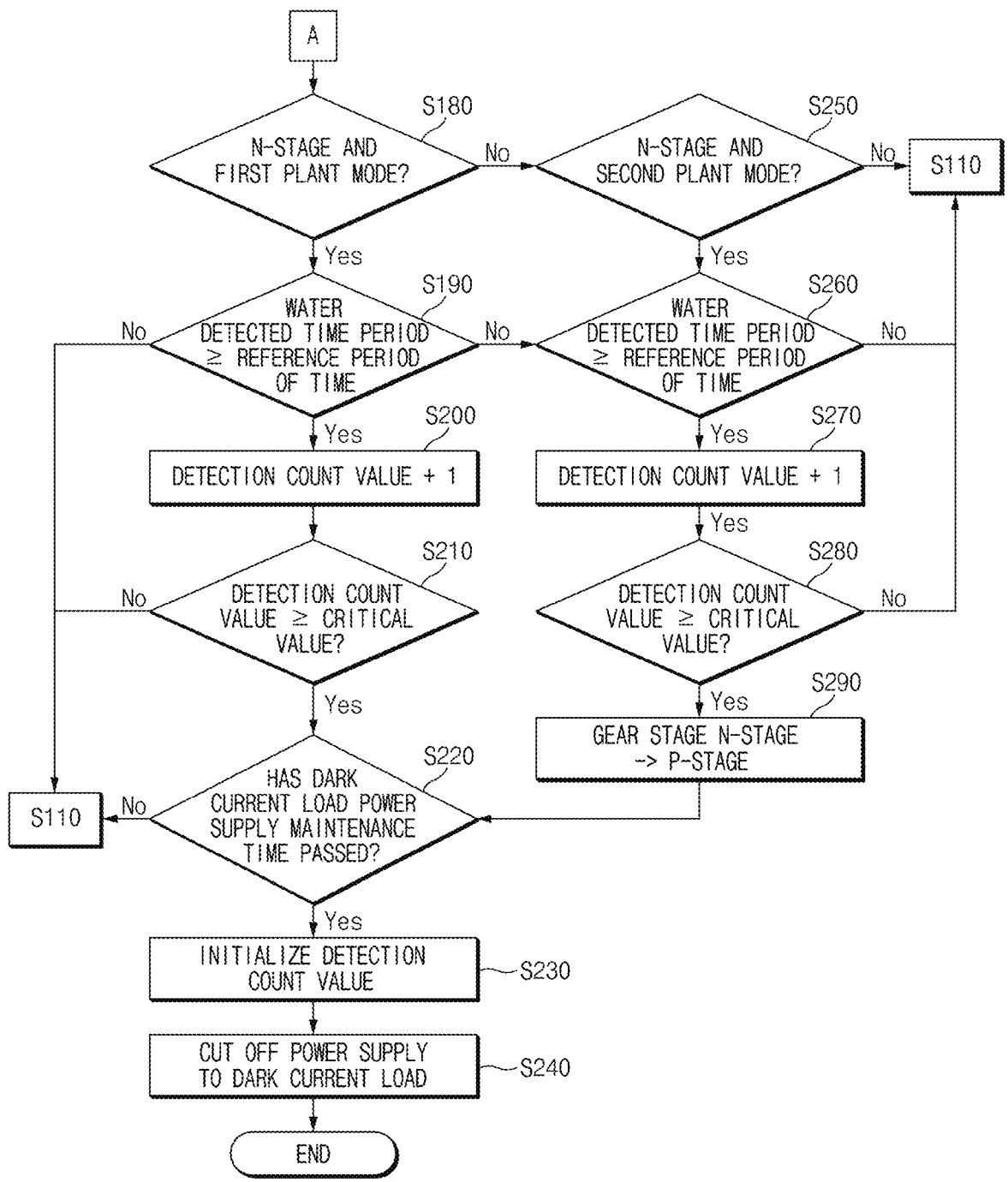

As shown in FIG. 4, the power controller 150 may be configured to determine whether the gear stage is in the N-stage and the first plant mode is selected (S180). In this regard, the first plant mode may include the mode in which the power controller 150 operates in the situation in which the normal vehicle test process is configured to be performed in the vehicle production process while maintaining the N-stage.

When it is determined that the gear stage is in the N-stage and the first plant mode is selected, the power controller 150 may be configured to determine whether the test process is performed in the vehicle production process. According to an exemplary embodiment of the present disclosure, the power controller 150 may be configured to determine whether the watertightness test process of spraying the water under the pressure for the predetermined time period while the vehicle is sealed is performed.

The power controller 150 may be configured to determine whether the time period for which the water sprayed under the pressure during the test process is detected by the rain sensor is greater than or equal to the reference time period (S190). When it is determined that the time period for which the water sprayed under the pressure during the test process is detected by the rain sensor is greater than or equal to the reference time period, the power controller 150 may be configured to determine that the watertightness test process is being performed and increase the detection count value by 1 (S200).

Whenever it is determined that the time period for which the water sprayed under the pressure during the test process is detected by the rain sensor is greater than or equal to the reference time period, the power controller 150 may increase the detection count value by 1 and determine whether the detection count value is greater than or equal to a predetermined value (S210).

When it is determined that the detection count value is greater than or equal to the predetermined value, the power controller 150 may be configured to determine whether the time period (the power supply maintenance time) for which the power supply to the dark current load 130 is maintained has passed (S220).

When the time period (the power supply maintenance time) for which the power supply to the dark current load 130 is maintained has passed, the power controller 150 may initialize the detection count value (S230). When the detection count value is initialized, the power controller 150 may cut off the power supply to the dark current load 130 (S240).

On the other hand, when it is determined that the first plant mode is not selected, the power controller 150 may be configured to determine whether the gear stage is in the N-stage and the second plant mode is selected (S250). In this regard, the second plant mode may include the mode in which the normal vehicle test process is not able to be performed in the vehicle production process while maintaining the N-stage, and thus, the gear stage is changed from the N-stage to the P-stage and then the power controller 150 operates.

When it is determined that the gear stage is in the N-stage and the second plant mode is selected, the power controller 150 may be configured to determine whether the test process is performed in the vehicle production process. According to an exemplary embodiment of the present disclosure, the power controller 150 may be configured to determine whether the watertightness test process of spraying the water under the pressure for the predetermined time period is performed while the vehicle is sealed.

The power controller 150 may be configured to determine whether the time period for which the water sprayed under the pressure during the test process is detected by the rain sensor is greater than or equal to the reference time period (S260). When it is determined that the time period for which the water sprayed under the pressure during the test process is detected by the rain sensor is greater than or equal to the reference time period, the power controller 150 may be configured to determine that the watertightness test process is being performed and increase the detection count value by 1 (S270).

Whenever it is determined that the time period for which the water sprayed under the pressure during the test process is detected by the rain sensor is greater than or equal to the reference time period, the power controller 150 may increase the detection count value by 1 and determine whether the detection count value is greater than or equal to the predetermined value (S280).

When it is determined that the detection count value is greater than or equal to the predetermined value, the power controller 150 may forcibly change the gear stage from the N-stage to the P-stage (S290). The power controller 150 may be configured to determine whether the time period (the power supply maintenance time) for which the power supply to the dark current load 130 is maintained has passed when the gear stage is changed to the P-stage (S220).

When the time period (the power supply maintenance time) for which the power supply to the dark current load 130 is maintained has passed, the power controller 150 may initialize the detection count value (S230), and cut off the power supply to the dark current load 130 (S240).

Figure 5:
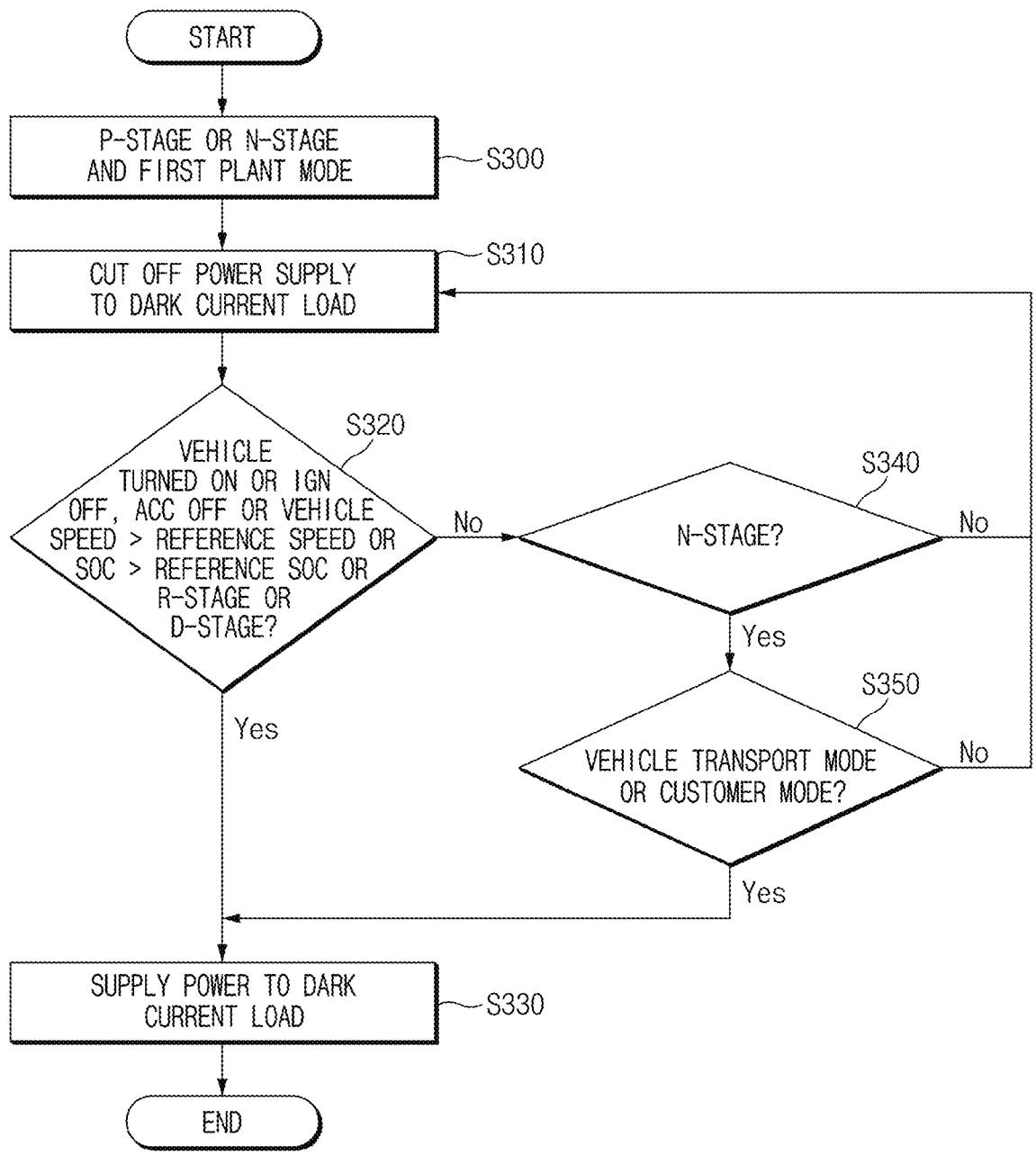

As shown in FIG. 5, when the gear stage is set to the P-stage or the gear stage is in the N-stage and the first plant mode is selected (S300), and it is determined that the power supply to the dark current load 130 is cut off (S310), the power controller 150 determines whether the vehicle is turned on, the vehicle state is changed to the IGN OFF state and the ACC OFF state, the vehicle speed exceeds the reference speed, the battery SOC exceeds the reference SOC value, or the gear stage changes from the P-stage or the N-stage to the R-stage or the D-stage (S320).

When the gear stage is set to the P-stage or the gear stage is in the N-stage and the first plant mode is selected, and it is determined that the power supply to the dark current load 130 is cut off, the power controller 150 may release the cut-off of the power supply to the dark current load 130 and allow the power to be supplied thereto when it is determined that the vehicle is turned on, the vehicle state is changed to the IGN OFF state and the ACC OFF state, the vehicle speed exceeds the reference speed, the battery SOC exceeds the reference SOC value, or the gear stage changes from the P-stage or the N-stage to the R-stage or the D-stage (S330).

On the other hand, when it is determined that the vehicle is not turned on, the vehicle state is not changed to the IGN OFF state and the ACC OFF state, the vehicle speed does not exceed the reference speed, the battery SOC does not exceed the reference SOC value, and the gear stage is not changed from the P-stage or the N-stage to the R-stage or the D-stage, the power controller 150 may be configured to determine whether the gear stage is in the N-stage (S340).

When it is determined that the gear stage is in the N-stage, the power controller 150 may be configured to determine whether the vehicle transport mode or the customer mode is selected as the power control mode (S350). In this regard, the vehicle transport mode may include the mode in which the power controller 150 operates while the vehicle is transported to the customer after the vehicle production process is completed, and the customer mode may include the mode in which the power controller 150 operates after the vehicle is delivered to the customer.

When it is determined that the gear stage is in the N-stage and the vehicle transport mode or the customer mode is selected as the power control mode, the power controller 150 may release the cut-off of the power supply to the dark current load 130 and allow the power to be supplied thereto (S330).

When it is determined that the gear stage is not in the N-stage or the vehicle transport mode and the customer mode are not selected as the power control mode, the power controller 150 may allow the cut-off of the power supply to the dark current load 130 to be maintained (S310).

Figure 6:
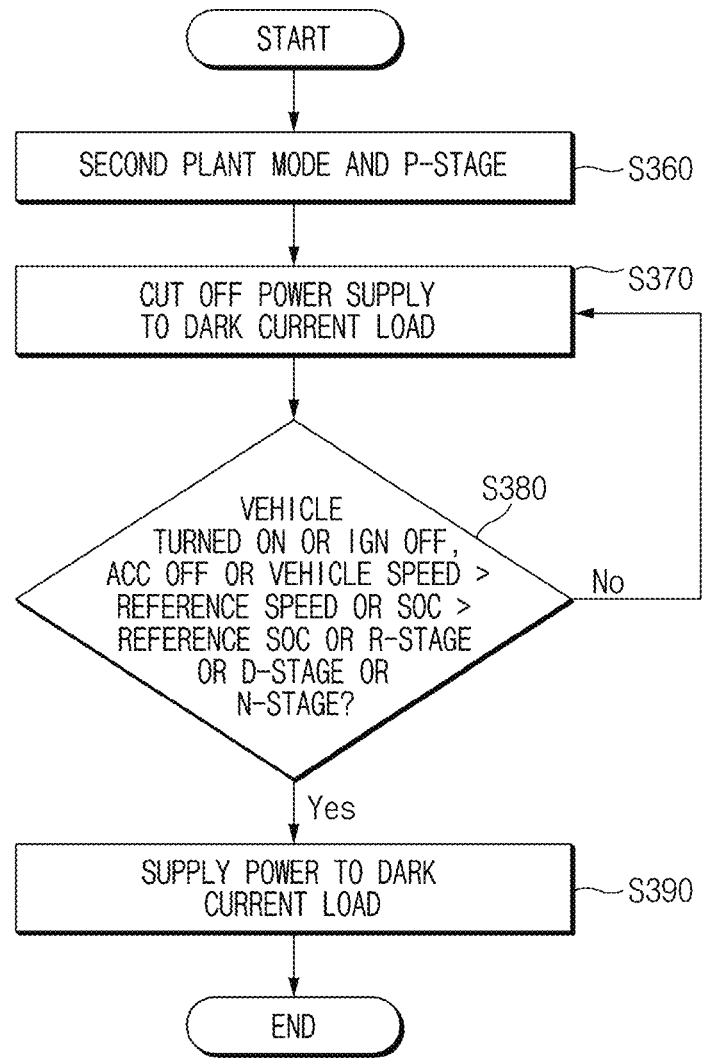

As shown in FIG. 6, when the second plant mode is selected and the gear stage is changed to the P-stage (S360), and it is determined that the power supply to the dark current load 130 is cut off (S370), the power controller 150 determines whether the vehicle is turned on, the vehicle state is changed to the IGN OFF state and the ACC OFF state, the vehicle speed exceeds the reference speed, the battery SOC exceeds the reference SOC value, or the gear stage changes from the P-stage to the R-stage, the D-stage, or the N-stage (S380).

When the second plant mode is selected, the gear stage is changed to the P-stage, and it is determined that the power supply to the dark current load 130 is cut off, the power controller 150 may release the cut-off of the power supply to the dark current load 130 and allow the power to be supplied thereto when it is determined that the vehicle is turned on, the vehicle state is changed to the IGN OFF state and the ACC OFF state, the vehicle speed exceeds the reference speed, the battery SOC exceeds the reference SOC value, or the gear stage changes from the P-stage to the R-stage, the D-stage, or the N-stage (S390).

Figure 7:
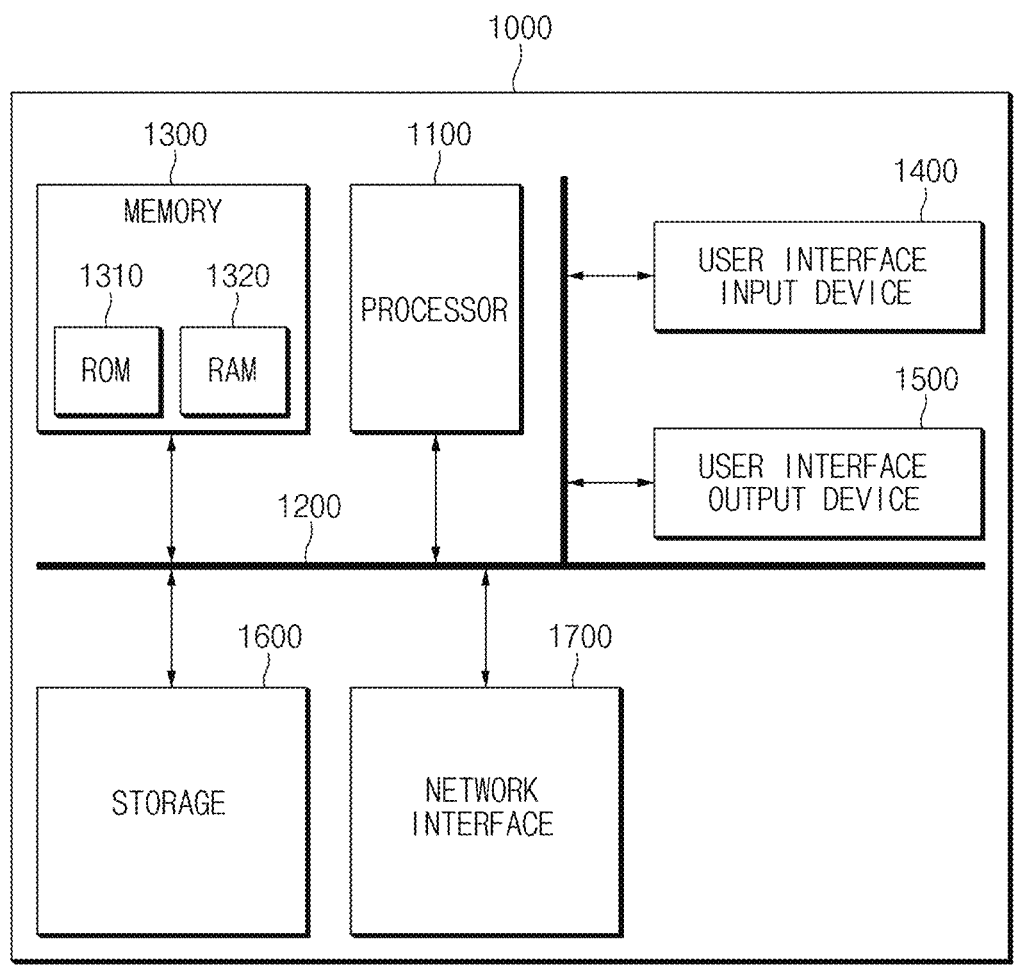
FIG. 7 is a diagram illustrating a configuration of a computing system executing a method according to an exemplary embodiment of the present disclosure.

FIG. 7 illustrates a configuration of a computing system for executing a method according to an exemplary embodiment of the present disclosure.

With reference to FIG. 7, a computing system 1000 may include at least one processor 1100, a memory 1300, a user interface input device 1400, a user interface output device 1500, storage 1600, and a network interface 1700 connected via a bus 1200.

The processor 1100 may be a central processing unit (CPU) or a semiconductor device that performs processing on commands stored in the memory 1300 and/or the storage 1600. The memory 1300 and the storage 1600 may include various types of volatile or non-volatile storage media. For example, the memory 1300 may include a Read-Only Memory (ROM) 1310 and a Random Access Memory (RAM) 1320.

Thus, the operations of the method or the algorithm described in connection with the exemplary embodiments included herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM. The exemplary storage medium is coupled to the processor 1100, which may read information from, and write information to, the storage medium. In another method, the storage medium may be integral with the processor 1100. The processor and the storage medium may reside within an application specific integrated circuit (ASIC). The ASIC may reside within the user terminal. In another method, the processor and the storage medium may reside as individual components in the user terminal.

The description above is merely illustrative of the technical idea of the present disclosure, and various modifications and changes may be made by those skilled in the art without departing from the essential characteristics of the present disclosure.

Therefore, the exemplary embodiments included in the present disclosure are not intended to limit the technical idea of the present disclosure but to illustrate the present disclosure, and the scope of the technical idea of the present disclosure is not limited by the embodiments. The scope of the present disclosure should be construed as being covered by the scope of the appended claims, and all technical ideas falling within the scope of the claims should be construed as being included in the scope of the present disclosure.

The device and the method for controlling the vehicle according to an exemplary embodiment of the present disclosure may allow the control to block the dark current to be performed even at the vehicle production plant that produces the vehicle before delivering the vehicle to the customer, preventing the reduction in the vehicle production unit per hour (UPH), such as the production line stoppage resulted from the battery discharge at the vehicle production plant, the inspection time delay, the increase in the production time resulted from the additional battery charging, and the decrease in the quality pass rate.

The device and the method for controlling the vehicle according to an exemplary embodiment of the present disclosure may allow the dark current to be appropriately blocked based on the vehicle production plant environment by allowing the dark current blocking mode to be selected based on the terrain and the environment of the vehicle production plant.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

In an exemplary embodiment of the present disclosure, the vehicle may be referred to as being based on a concept including various means of transportation. In some cases, the vehicle may be interpreted as being based on a concept including not only various means of land transportation, such as cars, motorcycles, trucks, and buses, that drive on roads but also various means of transportation such as airplanes, drones, ships, etc.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the present specification, unless stated otherwise, a singular expression includes a plural expression unless the context clearly indicates otherwise.

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

According to an exemplary embodiment of the present disclosure, components may be combined with each other to be implemented as one, or some components may be omitted.

Hereinafter, the fact that pieces of hardware are coupled operably may include the fact that a direct and/or indirect connection between the pieces of hardware is established by wired and/or wirelessly.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An apparatus for controlling a vehicle, the apparatus comprising:
    a sensor configured to obtain state information of the vehicle; and
    a power controller operatively connected to the sensor and configured to:
        receive the state information of the vehicle from the sensor;
        determine whether an activation condition of a dark current blocking control function is satisfied based on the state information of the vehicle;
        determine whether a power control mode is selected in response that the power controller concludes that the activation condition of the dark current blocking control function is not satisfied; and
        control to cut off power supply to a dark current load based on the selected power control mode.

2. The apparatus of claim 1, wherein the power controller is further configured to determine whether the power control mode including a first plant mode and a second plant mode is selected in response that the activation condition of the dark current blocking control function is not satisfied.

3. The apparatus of claim 2, wherein the power controller is further configured to determine whether a test process is performed in a vehicle production process in response that the power control mode is selected.

4. The apparatus of claim 3, wherein the test process includes a watertight test process of spraying water under a pressure for a predetermined time period while the vehicle is sealed.

5. The apparatus of claim 4,
    wherein the sensor includes a rain sensor, and
    wherein the power controller is further configured to increase a detection count value whenever the power controller concludes via the rain sensor that a time period in which the water is sprayed under the pressure during the watertightness test process is greater than or equal to a reference time period.

6. The apparatus of claim 5, wherein the power controller is further configured to determine whether a dark current load power supply maintenance time has passed in response that the first plant mode is selected and the detection count value is greater than or equal to a predetermined value.

7. The apparatus of claim 6, wherein the power controller is further configured to cut off the power supply to the dark current load in response that the first plant mode is selected, the detection count value is greater than or equal to the predetermined value, and the dark current load power supply maintenance time has passed.

8. The apparatus of claim 6, wherein the power controller is further configured to change a gear stage from an N-stage to a P-stage and determine whether the dark current load power supply maintenance time has passed in response that the second plant mode is selected and the detection count value is greater than or equal to the predetermined value.

9. The apparatus of claim 8, wherein the power controller is further configured to cut off the power supply to the dark current load in response that the second plant mode is selected, the detection count value is greater than or equal to the predetermined value, the gear stage is changed from the N-stage to the P-stage, and the dark current load power supply maintenance time has passed.

10. A method for controlling a vehicle, the method comprising:
    determining, by a processor, whether an activation condition of a dark current blocking control function is satisfied based on state information of the vehicle;
    determining, by the processor, whether a power control mode is selected in response that the activation condition of the dark current blocking control function is not satisfied; and
    controlling, by the processor, to cut off power supply to a dark current load based on the selected power control mode.

11. The method of claim 10, further including:
    determining, by the processor, whether the power control mode including a first plant mode and a second plant mode is selected in response that the activation condition of the dark current blocking control function is not satisfied.

12. The method of claim 11, further including:
    determining, by the processor, whether a test process is performed in a vehicle production process in response that the power control mode is selected.

13. The method of claim 12, wherein the test process includes a watertight test process of spraying water under a pressure for a predetermined time period while the vehicle is sealed.

14. The method of claim 13, further including:
    increasing, by the processor, a detection count value whenever the power controller concludes via a rain sensor that a time period in which the water is sprayed under the pressure during the watertightness test process is greater than or equal to a reference time period.

15. The method of claim 14, further including:
    determining, by the processor, whether a dark current load power supply maintenance time has passed in response that the first plant mode is selected and the detection count value is greater than or equal to a predetermined value.

16. The method of claim 15, further including:

cutting off, by the processor, the power supply to the dark current load in response that the power controller concludes that the first plant mode is selected, the detection count value is greater than or equal to the predetermined value, and the dark current load power supply maintenance time has passed.

17. The method of claim 15, further including:

changing, by the processor, a gear stage from an N-stage to a P-stage and determining, by the processor, whether the dark current load power supply maintenance time has passed in response that the second plant mode is selected and the detection count value is greater than or equal to the predetermined value.

18. The method of claim 17, further including:

cutting off, by the processor, the power supply to the dark current load in response that the second plant mode is selected, the detection count value is greater than or equal to the predetermined value, the gear stage is changed from the N-stage to the P-stage, and the dark current load power supply maintenance time has passed.

* * * * *